United States Patent
Gusikhin et al.

(10) Patent No.: US 10,178,496 B2
(45) Date of Patent: Jan. 8, 2019

(54) IN-VEHICLE DEVICE POSITION DETERMINATION

(71) Applicant: Ford Global Technologies, LLC, Dearborn, MI (US)

(72) Inventors: Oleg Yurievitch Gusikhin, Commerce Township, MI (US); Perry Robinson MacNeille, Lathrup Village, MI (US); John William Schmotzer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/745,950

(22) PCT Filed: Aug. 4, 2015

(86) PCT No.: PCT/US2015/043559
§ 371 (c)(1),
(2) Date: Jan. 18, 2018

(87) PCT Pub. No.: WO2017/023298
PCT Pub. Date: Feb. 9, 2017

(65) Prior Publication Data
US 2018/0213351 A1 Jul. 26, 2018

(51) Int. Cl.
*H04W 24/00* (2009.01)
*H04W 4/02* (2018.01)
(Continued)

(52) U.S. Cl.
CPC ............ *H04W 4/02* (2013.01); *G01S 1/70* (2013.01); *G01S 3/781* (2013.01); *G01S 5/00* (2013.01);
(Continued)

(58) Field of Classification Search
CPC .......... H04W 4/02; H04W 4/40; H04W 4/80; H04W 4/008; H04W 4/043; H04N 5/235;
(Continued)

(56) References Cited

U.S. PATENT DOCUMENTS

| 8,248,467 B1 * | 8/2012 | Ganick | G01C 21/206 340/13.24 |
| 8,964,016 B2 * | 2/2015 | Ganick | G01S 1/70 348/61 |

(Continued)

FOREIGN PATENT DOCUMENTS

CN 104050991 9/2014
KR 20150057839 A * 5/2015
(Continued)

OTHER PUBLICATIONS

International Search Report and Written Opinion re: International Appl. PCT/US2015/043559 dated Oct. 9, 2015.
(Continued)

*Primary Examiner* — Mahendra Patel
(74) *Attorney, Agent, or Firm* — Jennifer M. Stec; Bejin Bieneman PLC (57) ABSTRACT

A system comprising a mobile computing device that includes a processor and a memory. The memory storing programming executable by the processor to detect an identifier in each of two or more of asynchronous light sources detected by a light sensor, the identifier including a position of the light source and use at least a coordinate system having an origin in the light sensor and the position of the light source, to determine a location of the mobile device.

20 Claims, 4 Drawing Sheets (51) Int. Cl.
*H04W 4/80* (2018.01)
*G01S 5/00* (2006.01)
*H04W 4/04* (2009.01)
*G01S 1/70* (2006.01)
*G01S 5/16* (2006.01)
*H04W 4/40* (2018.01)
*G01S 3/781* (2006.01)

(52) U.S. Cl.
CPC .............. *G01S 5/16* (2013.01); *H04W 4/046* (2013.01); *H04W 4/40* (2018.02); *H04W 4/80* (2018.02)

(58) Field of Classification Search
CPC .. H04N 5/374; H04B 10/116; H04B 10/1149; H05B 37/0272; G01S 3/781; G01S 1/70; G01C 21/206; G06F 17/30522; G06Q 30/02
USPC ............. 455/456.1; 348/116; 340/13.24, 331
See application file for complete search history.

(56) References Cited

U.S. PATENT DOCUMENTS

| | | | | |
|---|---|---|---|---|
| 8,994,799 B2* | 3/2015 | Ganick | ..................... | G01S 1/70 348/61 |
| 9,287,976 B2* | 3/2016 | Ganick | ..................... | G01S 1/70 |
| 2013/0030747 A1* | 1/2013 | Ganick | ................ | G01C 21/206 702/95 |
| 2013/0141555 A1* | 6/2013 | Ganick | ..................... | G01S 1/70 348/61 |
| 2013/0336094 A1* | 12/2013 | Gruteser | ................. | G01S 11/14 367/117 |
| 2014/0093249 A1* | 4/2014 | Roberts | ................ | G01C 21/165 398/127 |
| 2014/0280316 A1* | 9/2014 | Ganick | ............ | G06F 17/30522 707/769 |
| 2014/0301737 A1* | 10/2014 | Guo | ...................... | H04B 10/116 398/118 |
| 2014/0313520 A1* | 10/2014 | Naethke | .................... | G01S 1/70 356/614 |
| 2014/0375982 A1* | 12/2014 | Jovicic | .................. | G01B 11/14 356/72 |
| 2015/0057839 A1* | 2/2015 | Chang | .................. | B60R 16/037 701/2 |
| 2015/0147067 A1* | 5/2015 | Ryan | .................... | H04B 10/116 398/118 |

FOREIGN PATENT DOCUMENTS

| | | | |
|---|---|---|---|
| WO | 2014037866 A1 | 3/2014 | |
| WO | 2014187968 A1 | 11/2014 | |
| WO | WO 2014204753 A1 * | 12/2014 | ............. G01B 11/14 |

OTHER PUBLICATIONS

Kuo et al., "Luxapose: Indoor Positioning with Mobile Phones and Visible Light", MobiCom '14, Sep. 14-11, 2014, Maui, HI.
Kuo et al., "System Architecture Directions for a Software-Defined Lighting Infrastructure", VLCS '14, Sep. 7, 2014, Maui, HI.

* cited by examiner

IN-VEHICLE DEVICE POSITION DETERMINATION

CROSS-REFERENCE TO RELATED APPLICATIONS

This patent application is filed under 35 U.S.C. § 371 as a national stage of, and as such claims priority to, International Patent Application No. PCT/US2015/043559, filed on 4 Aug. 2015, the foregoing application is incorporated herein by reference in its entirety.

BACKGROUND

In-vehicle positioning services refer to locating mobile devices within or relative to a vehicle. In-vehicle positioning may be used to provide personalized content to specific mobile devices and/or their locations within the vehicle. For example, a first mobile device may be providing a streaming video, while a second device is providing an online multiplayer game. However, it is important to help prevent the operator of the vehicle from being distracted by mobile device content.

Techniques based on received signal strength indication (RSSI) from wireless communications, e.g., Wi-Fi and Bluetooth wireless access points, provide limited positional reliability. Complexities in vehicle environments cause radio waves to propagate in unpredictable ways, limiting the accuracy of positioning systems based on RSSI. Ultrasonic techniques (US), which transmit acoustic waves to microphones operate at lower frequencies than systems based on Wi-Fi and are susceptible to road noise interference.

DETAILED DESCRIPTION

Figure 1:
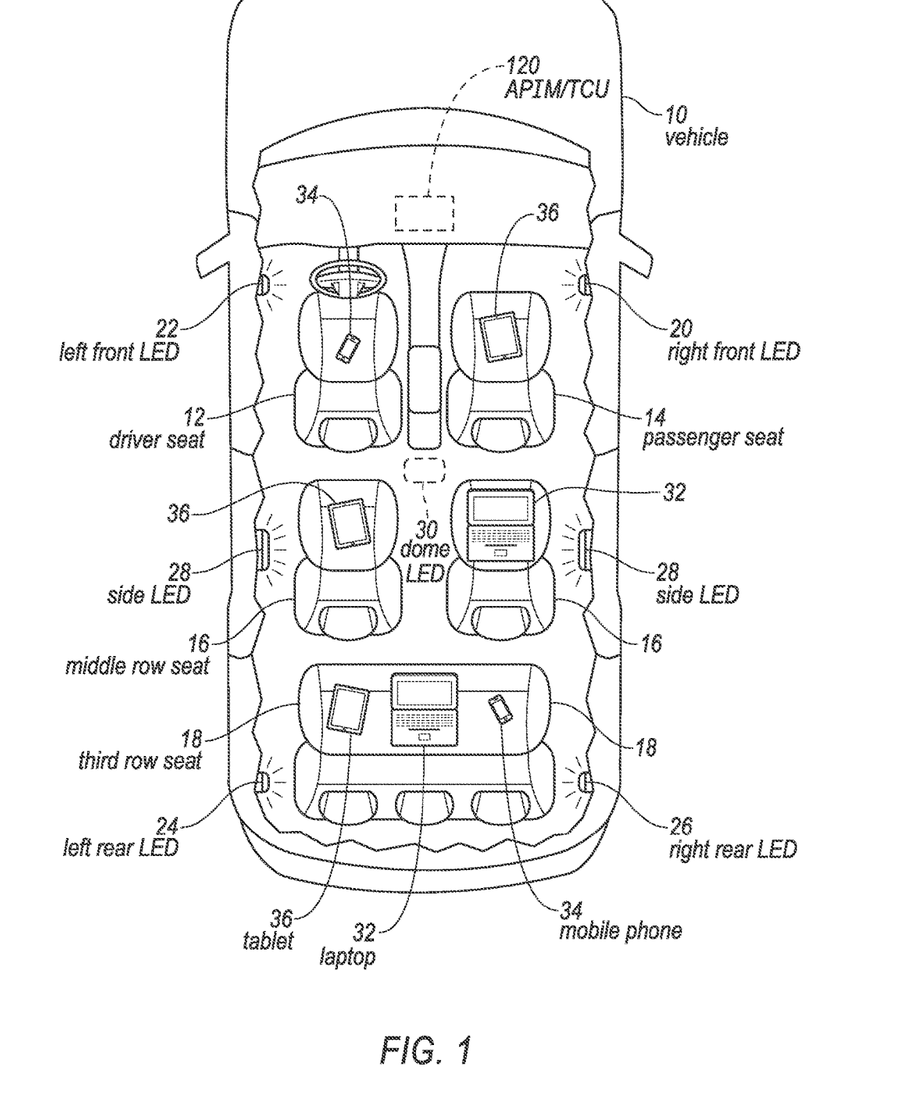
FIG. 1 illustrates an example vehicle with mobile devices at various positions throughout the vehicle receiving light from a plurality of LED light sources.

With reference to the Figures, wherein like numerals indicate like parts throughout the several views, FIG. 1 illustrates a plurality of mobile devices in a vehicle 10. For example, the mobile devices can include a laptop 32, a mobile phone 34, a tablet 36 or any small computing device, e.g., typically a device small enough to be wearable, carried, or handheld (sometimes referred to as a handheld computer or simply as a "handheld"), typically having a display screen with touch input keyboard, and/or other input mechanism(s). The mobile devices can be operated by an operator who may be occupying a seat that may be included in the vehicle 10, such as a driver seat 12, a passenger seat 14, a middle row seat 16 or a third row seat 18. A plurality of asynchronous light sources, such as light emitting diodes (LEDs) can be positioned throughout the vehicle 10. For example, a right front LED 20, a left front LED 22, a left rear LED 24, a right rear LED 26, a side LED 28, and a dome LED 30 can be placed in the vehicle 10.

Figure 2:
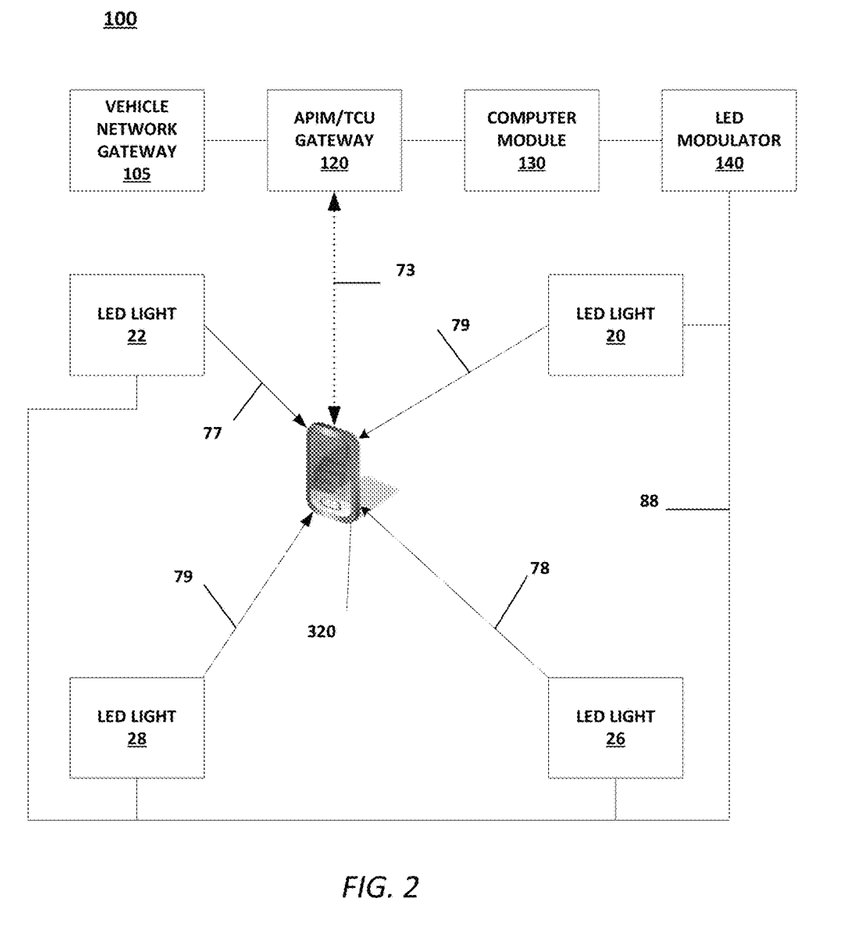
FIG. 2 illustrates the components of an example vehicle content delivery system based on a light-based device positioning.

Also referring now to FIG. 2, a computing device having a processor and a memory, e.g., a telematics unit such as is known, e.g., an accessory protocol interface module/telematic control unit (APIM/TCU) 120 allows mobile devices, such as the mobile phone 34 to connect with a telecommunications device (not show). The mobile phone can connect to a telecommunications provider through a vehicle 10 entertainment system (not shown) and to a network, such as the Internet via APIM/TCU 120 communication protocols, such as Wi-Fi protocols, Bluetooth protocols or any other near field communication (NFC) protocols which use wireless technology for exchanging data over short distances.

LEDs permit ambient lighting effects upon entry and during driving of a vehicle. For example, a three color LED can be controlled to produce a theoretically infinite number of colors and luminescences, which adds to a vehicle's ambient lighting and moods. A property of LEDs is that they can be turned off and on at frequencies that cannot be perceived by the human eye. For example, the duty cycle (the on-to-off ratio) of voltage supplied to the LED can be pulse-width-modulated (PWM) at a high frequency rate. PWM is a known technique to encode a message into a pulsing light emitted by LED. Therefore, it is possible to communicate information over the visible light spectrum utilizing LEDs. Visible Light Communications (VLCs) permit high speed data transfers using the LED as a transmitter, much like a radio frequency transmitter. LED modulation can include on/off keying (OOK), quadrature amplitude modulation (QAM), discrete multitone modulation/orthogonal frequency division multiplexing (DMT/OFDM), Infrared Data Association (IrDA) protocols and other methods of modulations, similar to radio frequency modulation techniques.

When in the vehicle 10 and through the use of his/her mobile phone 34, an occupant, i.e., user, can connect the mobile phone 34 via a network interface (a known element not shown for ease of illustration) of the mobile phone 34 to the vehicle 10 APIM/TCU server. Once connected, the user can obtain vehicle operations data (e.g., speed, fuel level, alerts or warnings related to vehicle components, etc.), road maps, control his/her seat's positioning, change stations on the radio, turn on a seat heater, obtain the heads up cockpit display of speed and various gauge information or adjust an in-seat chair massage, just to list a few of the possibilities of the mobile phone 34 capabilities and/or features when linked to the vehicle 10.

However, it is not always desirable to permit all of the occupants of the vehicle to operate all the capabilities and/or features of the vehicle 10. For example, a parent may not want a child in the third row seat 18 to watch movies on the tablet 36. The parent can configure the APIM/TCU 120 not to allow streaming movies to the third row seat 18 occupant. Additionally, the APIM/TCU 120 can be configured not to allow any devices in the driver seat 12 an ability to stream videos to the driver's mobile phone 34 when linked to the APIM/TCU 120 while the vehicle is in operation, as the video may possibly distract the driver.

Mobile Device Cameras

A camera within the mobile phone 34, more specifically, the camera's complementary metal oxide semiconductor (CMOS) sensor can be utilized to determine the in-vehicle position of the mobile phone 34. For example, a driver has the mobile phone 34 with a camera in their possession, using an optical angle of arrival (AoA) technique (discussed below) enables a mobile device location system to determine that the mobile phone 34 is in the area of the driver seat 12.

Additionally, the mobile phone 34 can use a rolling shutter to capture images on the CMOS sensor. The rolling shutter is a method of image capture in which a still picture is captured not by taking a snapshot of the entire scene at single instant in time, but rather by scanning across the scene rapidly, either vertically or horizontally. In other words, not all parts of the image of the scene are recorded at exactly the same instant. The advantage of this method is that the image sensor can continually gather photons during the acquisition process, thus effectively increasing sensitivity. The rolling shutter also produces predictable distortions called "fringes" caused by rapid flashes of light. The fringes allow for enhanced decoding of complex modulations transmitted by the LEDs.

The mobile phone 34 can include an accelerometer to obtain an orientation of the mobile phone 34. For example, switching between portrait and landscape modes. The mobile phone 34 can include a solid state compass, also known as a magnetometer which can also determine the orientation of the mobile phone 34. The solid state magnetometer is usually made from two or three magnetic field sensors which send data to the mobile phone 34, allowing the mobile phone 34 to calculate an alignment relative to a compass point.

Mobile Device Location

Referring again to FIG. 2, an exemplary configuration of a mobile device location system 100 is illustrated. A vehicle network gateway 105 is communicatively coupled to the APIM/TCU gateway 120, which is communicatively coupled to a computer 130. The computer 130 is communicatively coupled to the LED modulator 140. The LED modulator 140 is communicatively coupled to the right front LED 20, the left front LED 22, the right rear LED 26, and the side LED 28 via an LED bus 88 (which may be part of a vehicle communications bus or the like). The mobile phone 34, which is in an approximate location to the LEDs and the APIM/TCU 120 is communicatively coupled to the APIM/TCU 120 via a wireless communication channel 73, such as Wi-Fi, Bluetooth, a near field communication (NFC) or any other radio frequency communications technique. In addition, the mobile phone 34 is communicatively coupled to the LEDs, i.e., the mobile phone 34 can receive modulated light communication signals 77 from the aforementioned LEDs.

The vehicle network gateway 105 separates a vehicle 10 control network (not shown) from a vehicle 10 infotainment network. The term control network as used herein refers to a vehicle 10 communications bus or the like that, as is known, provides access to control various vehicle 10 operations. For example, via one or more electronic control units (ECUs) in a vehicle, as is known, it is possible to control vehicle 10 throttle, braking, steering, climate control, interior and exterior lights, etc. An infotainment network, on the other hand, as is known allows for access to various audio-visual media content, such as audio books, movies, radio stations, etc. The vehicle network gateway 105 is a firewall interface such as is known to protect the control network against network attacks, e.g., via access to the infotainment network. The APIM/TCU 120 provides an interface for mobile communication. For example, LTE, GSM, GPRS, Wi-Fi, Bluetooth or NFC. The APIM/TCU 120 can also contain the vehicle 10 Global Navigation Satellite System (GNSS) hybrid receivers which can receive the U.S. global positioning system (GPS), the Russian "GLObal NAvigation Satellite System (GLONASS), the European Union's Galileo GPS or China's Beidou GPS systems, which are commonly used in cars. The APIM/TCU 120 can contain an electronic processing unit, such as a microcontroller or some variation of a microprocessor along with a memory to hold executable code and data.

The right front LED 20, the left front LED 22, the right rear LED 26 and the side LED 28 are at predetermined fixed locations, i.e., positions, throughout the vehicle 10. The computer 130 uses the LED's position to determine a unique identifier for each of the LEDs. For example, for a position representing the right front LED 22, the computer 130 includes programming to program the LED modulator 140 with such an identifier signal, which is a unique or a substantially unique modulation code. The identifier signal corresponding to the LED's identifier is modulated at a modulation frequency at each LED, and sent out as an identifier broadcast in an LED emitted light wave 77. In other words, each LED will be turned off and on (i.e., modulated) with its own unique or substantially unique pattern, indicating each LED's position. For example, the computer 130 can include programming to program the LED modulator 140 so that the left-front LED 22 uses pulse-code modulation (PCM) to digitally transmit a modulated light signal on the an LED emitted light wave 77 identifying that the source of the light is that of the left-front LED 22 in the left front of the vehicle 10.

Figure 3:
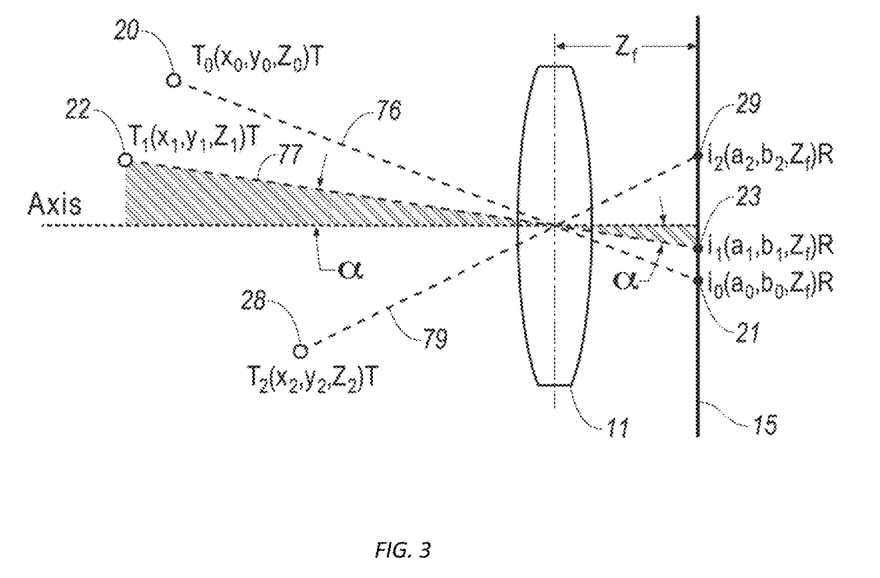
FIG. 3 illustrates an example of light-based positioning.

FIG. 3 illustrates the system 100 determining the location of the mobile phone 34 within the vehicle 10. The system 100 can use an optical angle of arrival (AoA) localization principle based on a camera with a biconvex lens 11 in the mobile phone 34 through an application (what is commonly called an "app") that is running on the mobile phone 34 and linked to the APIM/TCU 120. A property of the biconvex lens 11 is that a ray of light that passes through the center of the lens 11 is not refracted. This allows the AoA technique to determine a relative location of the mobile phone 34 to the LEDs. For example, the mobile phone 34 camera receives the LED emitted light wave 77 from the left front LED 22 when the mobile phone 34 camera is in the proximity of the LED 22. The LED 22 emitted light wave 77 passes through the center of the lens 11, and the straight line projection of left front LED 22 light wave is received by the phone 34 camera's CMOS sensor 15. The left front LED 22, with coordinates, in a three-dimensional Cartesian coordinate system mapped to the vehicle 10 interior with an origin at a center of the lens 11, of $(x_1, y_1, z_1)T$ has an image $i_1$ 21 with the coordinates of $(a_1, b_1, Z_1)Z_f$ on the CMOS sensor 15, a result of the LED 22 emitted light wave 77 passing through the center of the lens 11. $Z_f$ is the distance, generally measured by a number of pixels, from lens 11 to CMOS sensor 15.

By the geometry of similar triangles, one can define a scaling factor $K_0$ for the left front LED 22. The scaling factor, having an initially unknown value that is determined as described below, can be used to describe the left front LED 22 location (u0, v0, w0)R in the CMOS sensor 15 frame of reference, e.g., the coordinate system mentioned above, as: $u0=K_0 \times a_0$, $v0=K_0 \times b_0$ and $w_0=K_0 \times Z_f$. Because the position, e.g., coordinates, of the LED 22 is known, a distance between the LEDs 20, 22 and the lens 11 can be expressed. A set of quadratic equations can be written to express these distances in which the only remaining unknowns are the scaling factors K0, K1, . . . , Kn. For example, assume three LEDs, the right front LED 20 (T0), the left front LED 22 (T1), and the side LED 28 (T2) are at locations (x0, y0, z0)T, (x1, y1, z1)T1, and (x2, y2, z2)T2, respectively. The square of the distance between T0 and T1, denoted $d^2_{0,1}$, can be expressed in either of two domains, one being a distance measured in pixels, and the other being a distance measured using a physical measurement such as inches, millimeters, etc. In any event, as stated above, the coordinates can be mapped to the interior of the vehicle 10, e.g., coordinate boundaries can be specified for areas in the vehicle 10, such as a driver area, a front passenger area, a rear passenger area (which can be further divided into left, right, middle, etc.), etc. And in either domain, the coordinates can be used as follows:

$$d_{0,1}^2 = (u0 - u1)^2 + (v0 - v1)^2 + (w0 - w1)^2 \quad \text{Equation 1}$$
$$= (K_0 a_0 - K_1 a_1)^2 + (K_0 b_0 - K_1 b_1)^2 + Z^2 f(K_0 - K_1)^2 \quad \text{Equation 2}$$
$$= K_0^2 |\overrightarrow{Oi_0}|^2 + K_1^2 |\overrightarrow{Oi_1}|^2 - 2K_0 K_1 (\overrightarrow{O_{i0}} \cdot \overrightarrow{O_{i1}}) \quad \text{Equation 3}$$
$$= (x_0 - x_1)^2 + (y_0 - y_1)^2 + (z_0 - z_1)^2, \quad \text{Equation 4}$$

where $\overrightarrow{Oi_0}$ and $\overrightarrow{Oi_1}$ are the vectors from the center of the lens 11 to images $i_0$ ($a_0$, $b_0$, $Z_0$)$Z_f$ 21 and $i_1$ ($a_1$, $b_1$, $Z_1$)$Z_f$ 23, respectively. Therefore, with three known LED light sources, there are three unknown variables, $K_0$, $K_1$ and $K_2$, which can be determined using known procedures for solving quadratic equations compute locations of the LEDs 20, 22 with reference to the mobile device 34.

The mobile phone 34 and/or the APIM/TCU 120 can then further determine an area (e.g., seat), of the vehicle 10 in which the mobile phone 34 is located. The mobile phone 34 can upload its relative position to the APIM/TCU 120, and the APIM/TCU would then compute the specific location of the mobile phone 34. In operation, the mobile phone 34 can receive a map of positions from the APIM/TCU 120 which can assist the mobile phone 34 with its positioning determination. Additionally, the map of positions may include a vehicle 10 seating plan which contains the location of the seats.

It should be noted that a frequency of the modulation of the LEDs 20, 22, etc., should be selected at which a human will not detect any pulsing or flickering of the LED light source. For example, the human eye cannot detect a light repeating an on-off cycle when the light is being cycled over 200 hertz. Additionally, the AoA technique described above can be utilized at a low lumen intensity, such as night time driving when the LEDs are turned down or dimmed when low light is required.

In an exemplary embodiment, the driver can run an app through his/her mobile phone 34 that would cause the display on the driver's mobile phone 34 to be blank and/or dark. The app would permit a user in the vehicle 10 to control the mobile phone 34 by a touch screen, a steering wheel button, the vehicle 10 conventional controls such as a touchscreen vehicle console, gestures, a heads up display, a set of voice commands, and any other HMI devices available to the APIM/TCU 120 on the vehicle 10 system bus.

The LEDs used in the vehicle 10 can be a single color LED and/or or multi-color (usually a tricolor) LED. As discussed above, the multi-color LED permits the generation of numerous colors by using differing combinations and intensities of red, green and blue. Therefore, in an embodiment, each color of the tri-color LED could be uniquely modulated to have three separate communication channels from one LED source. For example, the multicolor LED can have location information being broadcast on the red portion, the green portion can respond to the mobile phone 34 queries and the blue can be modulated to broadcast news or rich site summary (RSS) feeds.

Figure 4:
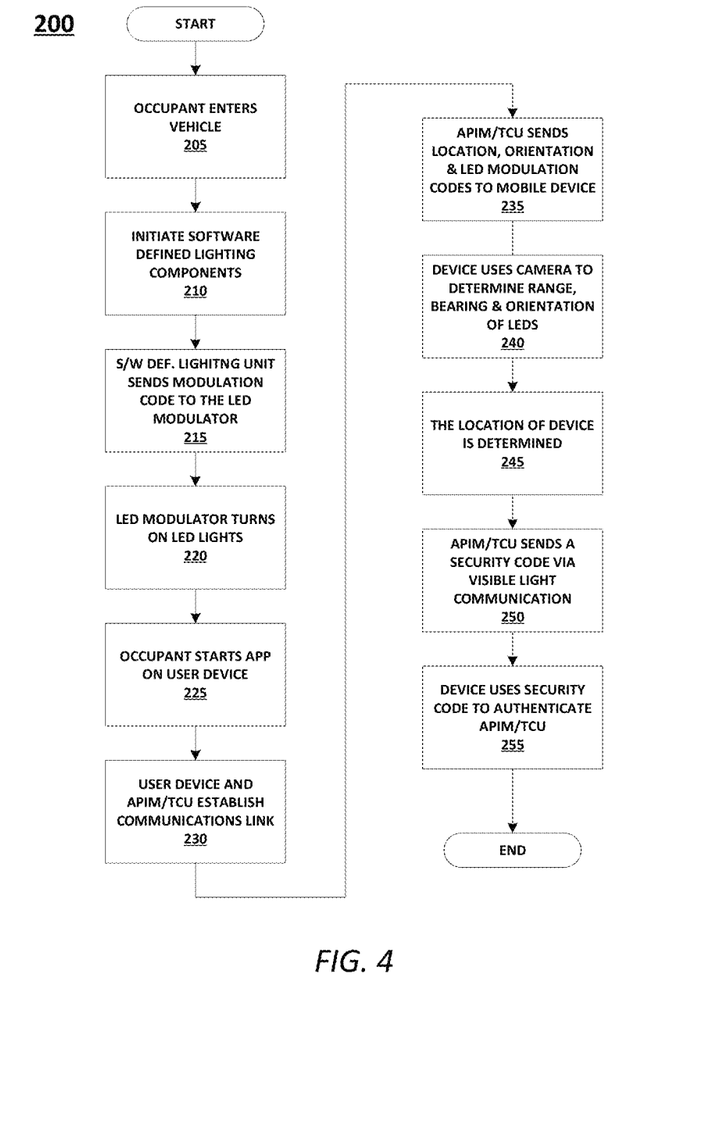
FIG. 4 is a flowchart of an exemplary process of the vehicle content delivery system of FIG. 1.

Now with reference to FIG. 4, a flowchart of an exemplary process 200 of a mobile device location system 100 is shown. The process begins when an occupant enters the vehicle 10 in a block 205. Next in a block 210, the LED lighting is initiated, i.e., the computer 130 and the LED modulator 140 power up and the computer 130 begins executing computer code as described above to generate and provide instructions to the modulator 140. In a next block 215, the computer 130 sends the unique or substantially unique LED modulation codes for each LED light in the vehicle 10 to the LED modulator 140. At that point, in a block 220, the LED modulator 140 then modulates each LED 20, 22, 24, 26, and/or 28, etc. according to a unique or substantially unique LED modulation pattern as described above, sometimes referred to as a light code.

Next, in a block 225, an occupant of the vehicle 10 starts a location app on his/her mobile device. For example, the occupant taps on the mobile device 34 display screen to start the location application on the mobile device 34. Next, in a block 230, the device 34 location application then connects to the APIM/TCU 120. For example, the mobile device 34 can connect to the APIM/TCU 120 via Wi-Fi, Bluetooth, NFC or any other radio frequency communications protocols.

Next, in a block 235, the APIM/TCU 120 sends the location, the orientation and the LED modulation codes to the mobile device 34. The mobile device 34 can then use its camera to determine the range, bearing and orientation of the LED lights in a block 240, e.g., determine a position of the device 34 in a three-dimensional coordinate system mapped to an interior of the vehicle 10, as described above. Next, in a block 245, the location of the device can be determined using the above discussed method or any other location algorithm.

Once the device 34 location is determined by the mobile device 34 and/or the APIM/TCU 120, or alternatively or additionally, another device, e.g., an electronic control unit, of the vehicle 10, the APIM/TCU 120 sends a security code to the mobile device 34 via the LEDs in a block 245. The security code can be a validation code, i.e., a permission, authorizing the mobile device 34 access to one or more specified levels or types of services of the vehicle 10 system 100. For example, once the system 100 has determined the mobile phone 34 is in the middle row seat 16 position, the system 100 can send the validation code permitting the mobile phone 34 to watch movies. In another example, if the mobile phone 34 is in the driver seat 12 position, the validation code can restrict the mobile phone 34 from watching movies using the vehicle 10 system 100.

In yet another example, the security code can be encryption key allowing the mobile phone 34 and the system 100 to set up an encrypted data link between the mobile phone 34 and the APIM/TCU 120. Encryption key exchange (also known as "key establishment") is a known practice using cryptography in which cryptographic keys are exchanged between two parties to set up a secure network pathway between devices. Following the block 255, the process 200 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices such as those discussed herein generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, C#, Visual Basic, Java Script, Perl, HTML, PHP, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non-volatile media, volatile media, etc. Nonvolatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system for determining a mobile device location, comprising a mobile computing device that includes a processor, and a memory, the memory storing programming executable by the processor to:
   detect an identifier in each of two or more of asynchronous light sources detected by a light sensor, the identifier including a position of the light source;
   determine an angle of arrival of a light wave received from at least one of the light sources;
   use at least a coordinate system having an origin in the light sensor and the position of the light source, to determine a location of the mobile device based at least in part on the determined angle of arrival; and
   communicate the location of the mobile device to a vehicle computer.

2. The system of claim 1, further comprising the vehicle computer, the vehicle computer including a processor and a memory, the memory of the vehicle computer storing instructions to communicate a permission to use a vehicle system to the mobile device.

3. The system of claim 2, wherein the vehicle system is an infotainment system.

4. The system of claim 1, wherein the asynchronous light source comprises a light emitting diode (LED).

5. The system of claim 1, wherein the memory includes further programming executable by the processor to determine an angle of arrival of a light wave received from at least one of the light sources and determine the location of the mobile device based at least in part on the determined angle of arrival.

6. The system of claim 1, further comprising a mobile device memory that stores a map of a vehicle interior, wherein the mobile device is further programmed to determine the location of the mobile device according to an area specified by the map of the vehicle interior.

7. The system of claim 6, wherein the two or more asynchronous light sources are in the vehicle, and the map includes an identifier and a positions for each of the two or more asynchronous light sources in the vehicle.

8. The system of claim 7, further comprising a vehicle computer, the vehicle computer including a processor and a memory, the memory of the vehicle computer storing instructions to direct modulation of each of the one or more light sources to generate the identifier for the respective light source; and
   determine a location of the mobile device further based on the identifier and the position of one or more light sources.

9. The system of claim 1, wherein the light sensor is a complementary metal oxide semiconductor (CMOS) sensor, and the mobile device is further programmed to determine respective distances in pixels of the one or more light sources from the sensor.

10. A method for determining a mobile device location, comprising:
    detecting an identifier in each of one or more of asynchronous light sources detected by a light sensor, the identifier including a position of the light source;
    determining an angle of arrival of a light wave received from at least one of the light sources;
    using at least a coordinate system having an origin in the light sensor and the position of the light source to determine a location of a mobile device based at least in part on the determined angle of arrival; and
    communicating the location of the mobile device to a vehicle computer.

11. The method of claim 10, further comprising determining an angle of arrival of a light wave received from at least one of the light sources and determining the location of the mobile device based at least in part on the determined angle of arrival.

12. The method of claim 10, further comprising communicating the location of the mobile device to a vehicle computer.

13. The method of claim 10, further comprising receiving a permission to use a vehicle system based on the determined location.

14. The method of claim 10, further comprising storing a map of a vehicle interior and determining the location of the mobile device according to an area specified by the map of the vehicle interior.

15. The method of claim 14, wherein the two or more asynchronous light sources are in the vehicle, and the map includes an identifier and a positions for each of the two or more asynchronous light sources in the vehicle.

16. The method of claim 15, further comprising:
directing modulation of each of the one or more light sources to generate the identifier for the respective light source; and
determining a location of the mobile device further based on the identifier and the position of one or more light sources.

17. The method of claim 10, wherein the light sensor is a complementary metal oxide semiconductor (CMOS) sensor, the method further comprising determining respective distances in pixels of the one or more light sources from the sensor.

18. A system, comprising:
two or more asynchronous light sources; and
a mobile computing device that includes a processor and a memory, the memory storing programming executable by the processor to:
direct modulation of each of the two or more light sources to generate the identifier for the respective light source;
detect an identifier in each of two or more of asynchronous light sources detected by a light sensor, the identifier including a position of the light source;
determine an angle of arrival of a light wave received from at least one of the light sources; and
using at least a coordinate system having an origin in the light sensor and the position of the light source, to determine a location of the mobile device based at least in part on the determined angle of arrival; and
communicate the location of the mobile device to a vehicle computer.

19. The system of claim 1, further comprising a biconvex lens, wherein the instructions further include instructions to determine the angle of arrival of the light wave received from at least one of the light sources through the biconvex lens.

20. The method of claim 10, further comprising determining the angle of arrival of the light wave received from at least one of the light sources through the biconvex lens.

* * * * *